(12) United States Patent
Nagano et al.

(10) Patent No.: US 6,370,317 B2
(45) Date of Patent: Apr. 9, 2002

(54) APPARATUS AND METHOD FOR CONTROLLING THE RECORDING OF TELEVISION PROGRAMS

(75) Inventors: Kae Nagano; Noboru Motoyoshi, both of Tokyo; Tomoyuki Hanai, Kanagawa; Kenji Hamamoto, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/776,030

(22) Filed: Feb. 2, 2001

Related U.S. Application Data

(63) Continuation of application No. 08/733,429, filed on Oct. 18, 1996, now Pat. No. 6,240,240.

(30) Foreign Application Priority Data

Oct. 27, 1995 (JP) ............................................. 7-302284
Dec. 26, 1995 (JP) ............................................. 7-350746

(51) Int. Cl.[7] ............................. H04N 5/76; H04N 5/91
(52) U.S. Cl. ......................................... 386/83; 386/83
(58) Field of Search ............................ 386/46, 83, 95; 348/906; 360/27; 328/563, 564; H04N 5/76, 5/91

(56) References Cited

U.S. PATENT DOCUMENTS

| | | | |
|---|---|---|---|
| 5,307,173 A | | 4/1994 | Yuen et al. |
| 5,315,452 A | * | 5/1994 | Hong .......................... 386/46 |
| 5,361,173 A | * | 11/1994 | Ishii et al. ..................... 360/27 |
| 5,379,153 A | | 1/1995 | Ishii et al. |
| 5,479,266 A | | 12/1995 | Young et al. |
| 5,576,773 A | | 11/1996 | Itagaki et al. |
| 5,686,954 A | * | 11/1997 | Yoshinobu et al. ......... 348/906 |

* cited by examiner

*Primary Examiner*—Huy Nguyen
(74) *Attorney, Agent, or Firm*—Frommer Lawrence & Haug LLP; William S. Frommer; Glenn F. Savit

(57) ABSTRACT

An apparatus and method for controlling the recording of television programs are disclosed. The apparatus displays electronic program guide information superposed on a television signal. The apparatus allows a plurality of desired programs to be reserved for recording based on the electronic program guide information. An icon is continuously displayed on a television screen in connection with the television picture signal when a program is reserved for recording. An altered form of the icon may be displayed on the television screen when execution of recording the reserved program is impossible due to a specific condition of a recording medium for recording the program. A corresponding method is described.

16 Claims, 15 Drawing Sheets

F I G. 2
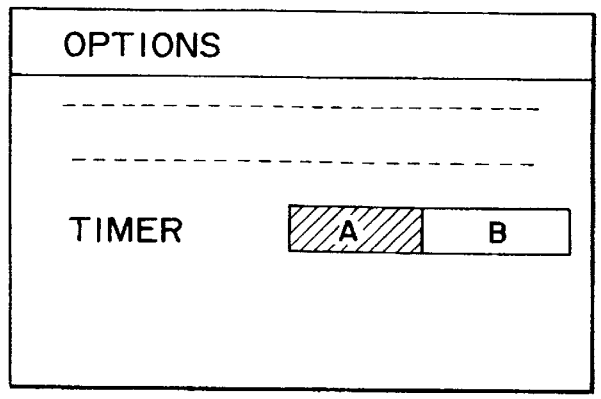
F I G. 3A
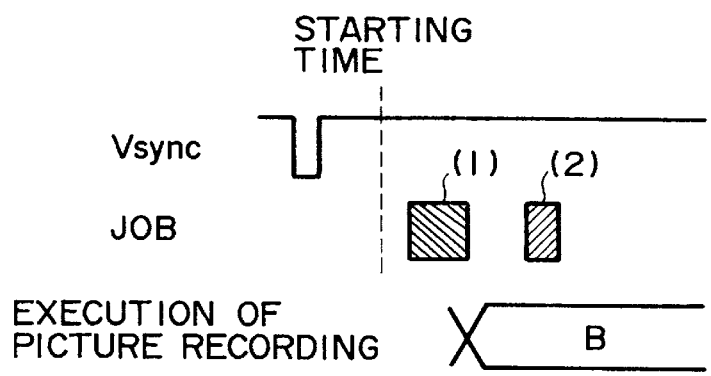
F I G. 3B
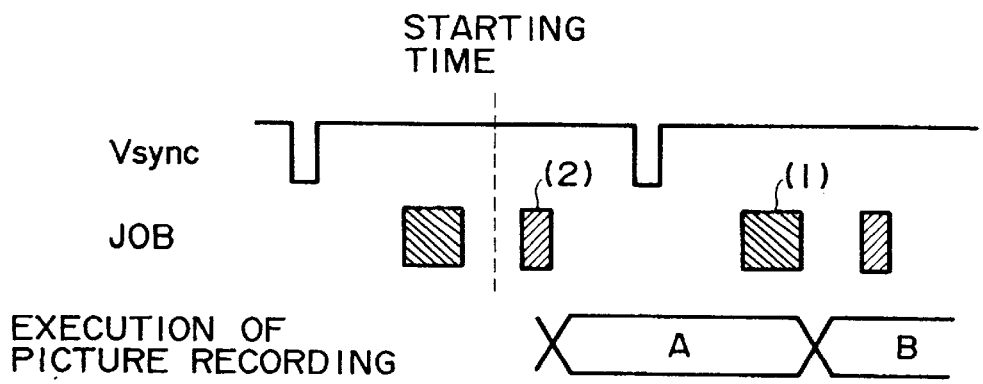

T ← --- ICON FOR INDICATING RESERVATION

| Program Guide |||
|---|---|---|
| SEP 7 | 8:00pm | 9:00pm |
| CSP2 | NEWS 1 | NEWS 2 |
| 26 | Famous American ||
| CNN | Primenews ||
| SHOW | City Slickers ||
| HBO | Bingo ||

F I G. 9A

| Program Guide | | |
|---|---|---|
| SEP 7 | 8:00pm | 9:00pm |
| CSP2 | NEWS 1 | NEWS 2 |
| 26 | Famous American | |
| CNN | Primenews | |
| SHOW | City Slickers | |
| HBO | Bingo | |

INDICATED BY A CURSOR

F I G. 9B

| Recordings |
|---|
| SHOW MON 8:00p City Slickers 2:00 |

FIG. 10

| TIMER SET | | | | |
|---|---|---|---|---|
| DATE | START | STOP | CH | |
| 7/6 WED | 7:00A | 8:00A | 6 | EP |
| -/- | -:-- | -:-- | — | — |
| -/- | -:-- | -:-- | — | — |
| -/- | -:-- | -:-- | — | — |
| -/- | -:-- | -:-- | — | — |

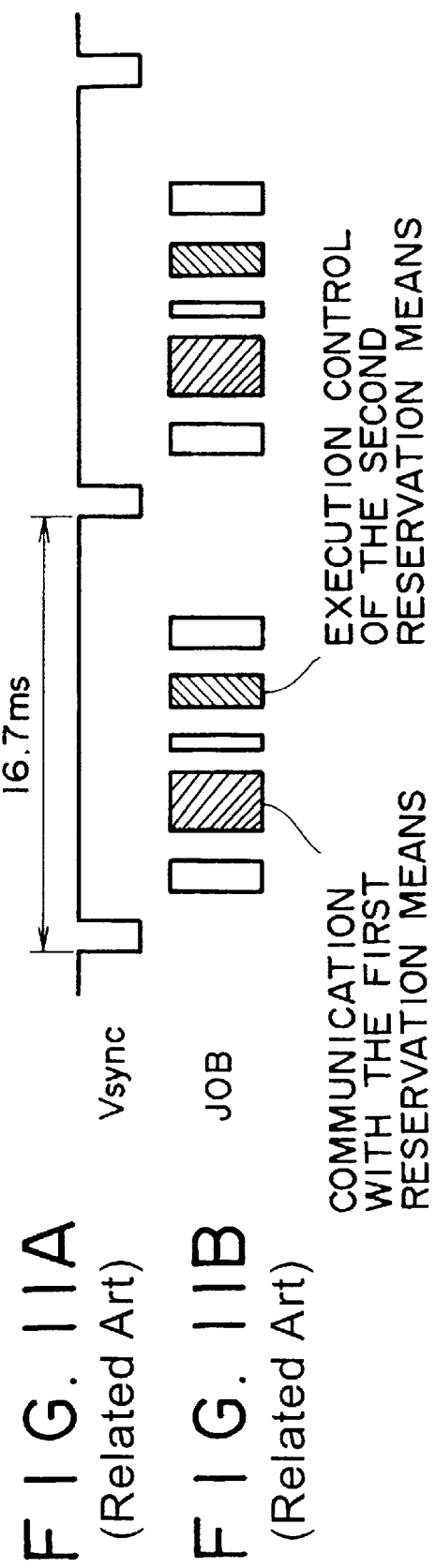

FIG. 12A
(Related Art)
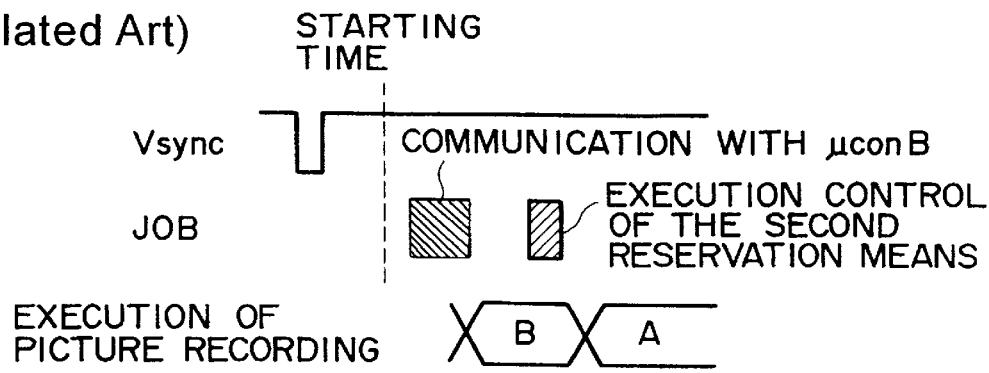
FIG. 12B
(Related Art)
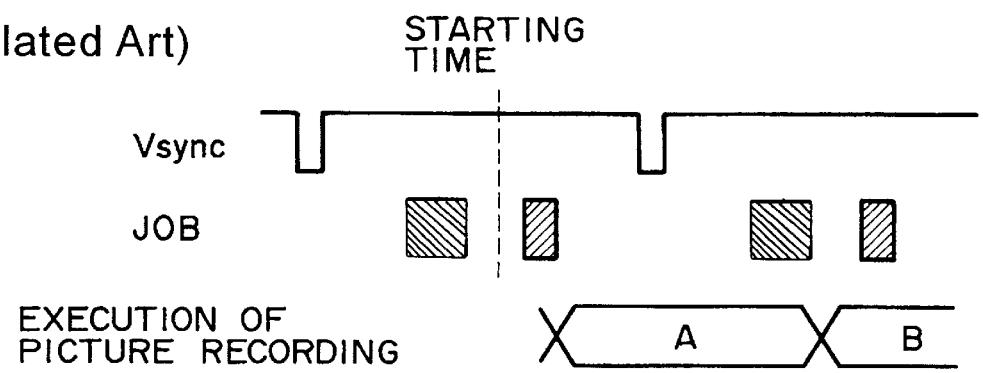
FIG. 14
| Program Guide | | |
|---|---|---|
| SEP 7 | 8:00pm | 9:00pm |
| A | News | |
| B | | Movie |

FIG. 17A

| Program Guide | | |
|---|---|---|
| SEP 7 | 8:00pm | 9:00pm |
| A | /News///////// | |
| B | | Movie |

FIG. 17B

| Program Guide | | |
|---|---|---|
| SEP 7 | 8:00pm | 9:00pm |
| A | \News\\\\\\\\\ | |
| B | | \?Movie\\ |

FIG. 17C

| Program Guide | | |
|---|---|---|
| SEP 7 | 8:00pm | 9:00pm |
| A | \News\\\\\\\\\ | |
| B | | \?Movie\\ |

| Program Guide | | |
|---|---|---|
| SEP 7 | 8:00pm | 9:00pm |
| A | \News//// | |
| B | | //Movie// |

FIG. 17E

| Over Lapped event | | | |
|---|---|---|---|
| A | MON 8:00p | News | 2:00 |
| B | MON 9:00p | Movie | 1:00 |

APPARATUS AND METHOD FOR CONTROLLING THE RECORDING OF TELEVISION PROGRAMS

This is a continuation of U.S. patent application Ser. No. 08/733,429, filed Oct. 18, 1996, now U.S. Pat. No. 6,240,240, entitled APPARATUS AND METHOD FOR CONTROLLING THE RECORDING OF TELEVISION PROGRAMS.

BACKGROUND OF THE INVENTION

1. Field of the Invention

This invention relates to a picture recorder having a reservation means for reserving and recording according a reservation any program of channels transmitted by way of the space or cable.

2. Description of Related Art

The television broadcasting program is transmitted by way of the space or the cable, namely cable television (CATV) to users.

An user selects a preferred program on the channel and watches the program on a TV set or records the program on a picture recorder. Then, a program is selected referring to a printed program table.

However, when many channels are available, for example 150 channels or like that, it is not easy to search a preferred program on a program table on which programs of, for example, 150 channels are listed.

For easy searching of a desired program, the method described herein under has been used, that is, data of the program table of each channel is inserted in the vertical blanking interval of the video signal of a specific channel so that the insertion does not disturb the television signal of the program, and such data is transmitted to users, a user views the transmitted program table data on a television display, and searches the channel to select the desired program of the channel.

This program table data is referred to as electronic program guide, the electronic program guide can be displayed on a screen for individual categories of program such as sports, news, and movies, and on the display of the electronic program guide on a screen, a user can select a program for receiving and can reserve for recording of a program.

One example of a program guide picture of such an electronic program guide displayed on a television set is shown in FIG. 8. In the figure, the first row shows the title of the program guide picture, "Program Guide" is displayed, the second row shows month, day, and time, the month and day "September 7" and two grids of "8:00 p.m." and "9:00 p.m." are shown. In the third and lower rows, channel names are shown in the left hand side and the names of program which will be broadcasted in the time indicated in the grids and the month and the day shown in the second row are shown in the right side hand correspondingly to the channel names. For example, it is shown that in the channel CSP2, NEWS1 will be broadcasted from 8:00 p.m. for one hour, and NEWS2 will be broadcasted from 9:00 p.m.. Similarly, in the channel 26, Famous American will be broadcasted from 8:00 p.m. for 2 hours.

Picture recording is reserved using a program guide picture as described herein above, the detail of the method is described referring to FIG. 9. A program guide picture as shown in FIGS. 9A–9B is displayed and the picture is scrolled until a program to be recorded is displayed on the screen. When the program to be recorded is displayed on the screen, a cursor is moved to the row of the program to be recorded by operating the cursor moving key. Then, the display where the cursor is moved to the row changes as shown in FIG. 9A. This change involves the change in display mode such as background color or reverse display.

In the example shown in the figure, a cursor is moved to the row of program City Slickers to be broadcasted in the channel SHOW from 8:00 p.m. on Sep. 7 for 2 hours, and the display mode of the program row changes. Then, by pushing the program reservation button (Rec key) in this condition, the recording of this program is reserved.

Upon pushing the button, the display on the screen changes to the picture for displaying the reserved program as shown in FIG. 9B, the program reservation picture of the program to be broadcasted on the channel SHOW from 8:00 p.m. on Sep. 7 for 2 hours is displayed for confirmation.

When a program is reserved using an electronic program guide on the above-mentioned electronic appliance, if the program desired to be reserved overlaps even over several minutes with a program which had been reserved already, the electronic appliance determines that the program desired to be reserved overlaps with a reserved program, and the electronic appliance rejects the new program reservation which overlaps.

However, when a user wants to confirm a reserved program which is overlap reserved, if the program desired to be reserved is displayed over a plurality of pages of the program guide picture, it is difficult to find the overlapped program.

Otherwise for example, when a program which overlaps with an already reserved program is desired to be reserved, the user once cancels the program reservation of the already reserved program and then operates the new program reservation. Such operations are troublesome for a user. Further, the program reservation using the program guide involves the reservation by program unit, therefore the time of picture recording can not be changed, for example, when the time of picture recording of a program overlaps partially, the desire that the partial program for picture recording which does not overlap, for example only the first half (second half), is recorded can not be accepted. This is a problem of the conventional program reservation system.

An electronic appliance for picture recording is provided usually with a reservation means for reserving a program by setting the picture recording month and day, picture recording time, and picture recording channel. One example is described referring to FIG. 10, FIG. 10 shows a picture display of such a reservation means, in this example picture display, July 6 WED is inputted and displayed as the picture recording month and day, 7:00 a.m. is inputted and displayed as the picture recording starting time, 8:00 a.m. is inputted and displayed as the picture recording ending time, 6 channel is inputted and displayed as the picture recording channel. A user reserves a program when confirming this displayed picture.

As described herein above, some electronic appliances are provided with two reservation means, namely, the first reservation means for reserving a program using the electronic program guide displayed on the television screen and the second reservation means for reserving a program by a method in which a user sets the picture recording month and day, picture recording time, and picture recording channel.

However, the first reservation means and the second reservation means operate reservation independently, therefore, when reservations by two reservation means overlap, the execution of reservation is involved in confusion, the confusion is a problem.

The problem is described in detail referring to FIGS. 11A–11B and FIGS. 12A–12B herein under. The first and second reservation means are executed by microcomputers respectively, and the job is performed with one period of a vertical synchronizing signal of a video signal as one cycle. The one cycle is about 16.7 ms for NTSC system as shown in FIG. 11A, time shared one period is assigned for execution time of various jobs. For example in FIG. 11B, an example of a job executed by a microcomputer ($\mu$icon A) for controlling the second reservation means is described, the job executed in the second shared time is a job for communication with the microcomputer ($\mu$con B) for controlling the first reservation means, the job executed in the fourth shared time is a job for controlling the execution of the second reservation means.

In other words, when the condition that time passes the starting time of the program reserved by the first reservation means is informed by the job executed in the second shared time, picture recording starts. When the time passes the starting time of the program reserved by the second reservation means, picture recording starts by the job executed in the fourth shared time.

If picture recording is reserved by the first reservation means and the second reservation means for the same month and day and the same time, the electronic appliance performs as described herein under.

When the picture recording starting time comes to the time point shown in the upper portion in FIG. 12A, $\mu$con A communicates with $\mu$con B by the job after the starting time, and $\mu$con A informs $\mu$con B that it is the just time of starting time of the program reserved by the first reservation means. Thereby, $\mu$con A executes (B) picture recording of the program reserved by the first reservation means.

Then, the control of the second reservation means is executed, by execution of this job, it is found that it is the just time of starting time of the program reserved by the second reservation means, $\mu$con A executes (A) picture recording of the program reserved by the second reservation means.

As described herein above, in this case, the recording program is changed at a moment as shown in FIG. 12A, finally the program reserved by the second reservation means is recorded.

Then, the time comes to the time point of picture recording starting time as shown on the upper portion of FIG. 12B, $\mu$con A executes control of the second reservation means by the job after the starting time, it is found that it is the just starting time of the program reserved by the second reservation means, and $\mu$con A executes (A) picture recording of the program reserved by the second reservation means.

In the next period of vertical synchronizing signal, $\mu$con A communicates with $\mu$con B, and $\mu$con B informs $\mu$con A that it is the just starting time of the program reserved by the first reservation means. Thereby, $\mu$con A executes (B) picture recording of the program reserved by the first reservation means.

As described herein above, in this case, finally the program reserved by the first reservation means is recorded as shown in FIG. 12B. As described hereinbefore, the reservation means by which the executed picture recording program is reserved is different depending on when the stating time comes, therefore the overlapped reservation causes confusion.

When an electronic appliance accepts a program reservation and then the power supply is turned off, the electronic appliance remains in the condition of reservation waiting, only when the electronic appliance is remained in reservation waiting, the condition of reservation waiting is displayed on the electronic appliance. However, when the program reservation is executed using the electronic program guide, if the electronic appliance is under supply of power, when the time comes to the starting time of reserved program, the picture recording starts. In that case, because the no indication of picture recording reservation is displayed on the screen, the user can not recognize the picture recording reservation, and a recording tape can not be prepared, this is another problem.

The condition that a recording tape is not prepared means such conditions that a recording tape set on the electronic appliance is not ready for recording, that a recording tape with the length insufficient for recording is set, and that a recorded recording tape which does not accept substitute recording is set.

The present invention is accomplished in view of solving these above-mentioned problems, and it is an object of the present invention to provide an electronic appliance having improved convenience for use when programs reserved using the electronic program guide are overlapped and having performance that, if picture recording reservations by two reservation means overlap, the reservation is executed without confusion.

Further, it is another object of the present invention to provide an electronic appliance which displays the existence of a program reservation when the program is reserved and power supply is on.

SUMMARY OF THE INVENTION

To achieve the object of the present invention, the present invention provides the electronic appliance which electronic appliance displays the electronic program guide information superposed on the television signal and is provided with the first reservation means for reservation of picture recording of a desired program based on the electronic program guide information, wherein, the electronic appliance is provided with a selection means for selecting one of overlapped programs reserved for picture recording when the time zone of the specified and reserved programs overlaps.

The electronic appliance is provided with a display means for displaying the picture recording reservation information of the overlapped program reserved for picture recording.

The starting time and/or ending time for the time zone where two or more programs overlap is corrected by key operation or the picture recording reservation of any one of overlapped programs are cancelled.

The electronic appliance of the present invention is provided with a setting means for setting the preferential execution of either picture recording reservations reserved by the first reservation means for reservation of picture recording on the display of the electronic program guide information superposed on the television signal or by the second reservation means for reserving picture recording by inputting at least recording time and recording channel.

In the above-mentioned picture recorder, the above-mentioned setting means is a mechanical switch or menu picture displayed on the screen, and further, the preference for execution of either picture recording reservations by the first or second reservation means may be set automatically depending on the specific information transmitted together with the electronic program guide.

In another electronic appliance of the present invention used to achieve the above-mentioned object, at least the first reservation means for picture recording reservation on the display of the electronic program guide transmitted is provided, and when a picture recording is reserved, the reservation display for indicating the condition that the picture recording is reserved is displayed always.

In yet another electronic appliance of the present invention, when a picture recording is reserved by the above-mentioned first reservation means, the above-mentioned reservation display may be displayed, and further the above-mentioned reservation display may be displayed by lighting on a light emitting diode or may be displayed by displaying an icon superimposed on the screen.

According to the present invention, when programs reserved for picture recording using the electronic program guide information overlap, the overlapped reserved programs are displayed, then correction of the picture recording starting time or picture recording ending time of the programs or cancellation is operated on the program guide picture, thus the convenience for use for picture recording reservation using the electronic program guide is improved.

Further, according to the present invention, the picture recording reservation is executed according to the preference for execution of either picture recording reservations by the first reservation means or by the second reservation means when the time comes to the picture recording reservation time, therefore the confusion in execution of reservation is prevented.

The display of picture recording reservation is displayed when a picture recording is reserved, and a recording tape which is surely available for recording is therefore set on the picture recorder.

BRIEF DESCRIPTION OF THE DRAWINGS

FIG. 2 is a diagram for illustrating an option picture displayed on the picture recorder of the present invention.

FIGS. 3A–3B is a set of diagrams, when the execution of reservation B is preferential in the picture recorder of the present invention, for illustrating the job executed by $\mu$con A when the time comes to the starting time just after Vsync and the timing of picture recording execution, and for illustrating the job executed by $\mu$con A when the time comes to the starting time just after communication processing with $\mu$con B and the timing of picture recording execution.

FIGS. 9A–9B is a set of diagram for illustrating a picture display of a method for program reservation using the electronic program guide.

FIG. 10 is a diagram for picture display of a method for program reservation by inputting picture recording month and day, and picture recording time.

FIGS. 11A–11B is a diagram for illustrating timing of job executed by $\mu$con A in the conventional picture recorder.

FIGS. 12A–12B is a set of diagrams for illustrating the job executed by $\mu$con A when the time comes to the starting time just after Vsync and timing of the picture recording execution, and for illustrating job executed by $\mu$con A when the time comes to the starting time just after communication processing with $\mu$con B and timing of the picture recording execution.

FIG. 14 is a diagram for illustrating an example of picture display when a program is reserved using the electronic program guide.

FIGS. 17A–17E is a set of diagrams for illustrating an example of picture display when the picture recording reservation is corrected on a program guide picture.

DETAILED DESCRIPTION OF THE PREFERRED EMBODIMENTS

Figure 1:
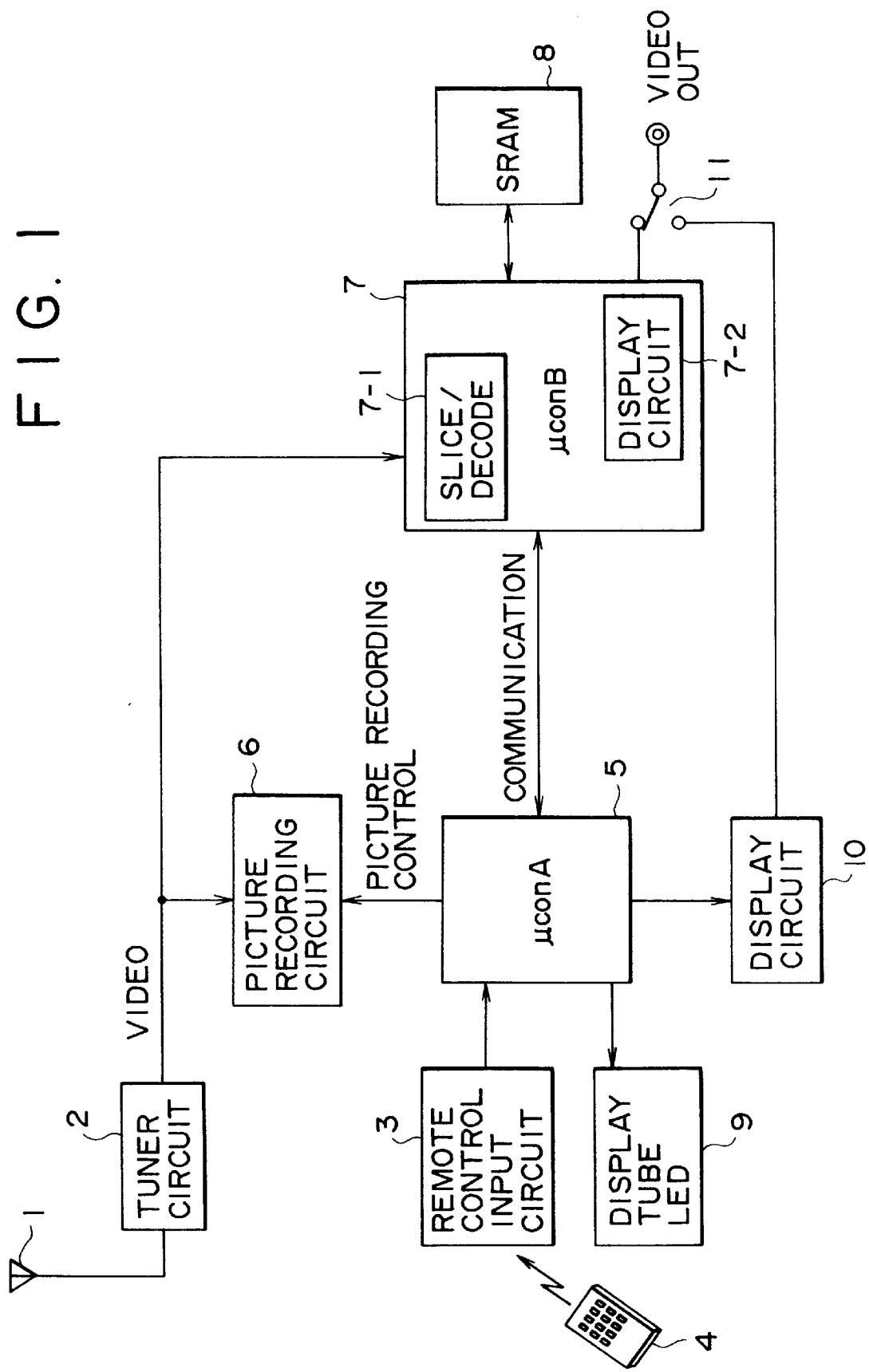
FIG. 1 is a block diagram for illustrating a structure of an embodiment of the picture recorder of the present invention.

The structure of an embodiment of the picture recorder of the present invention is shown in FIG. 1.

In the picture recorder shown in FIG. 1, a television signal inputted from an antenna 1 is inputted to a tuner circuit 2. The television signal of the channel selected by a user is converted to a video signal in the tuner circuit 2, and inputted to a picture recording circuit 6, and also inputted to a microcomputer device B 7 ($\mu$con B). The tuner circuit 2 selects channels to which the electronic program guide is inserted in the vertical blanking time period and outputs the electronic program guide information to $\mu$con B 7 during a specific time period while the picture recorder is, for example, in stand-by condition. The $\mu$con B 7 is provided with a slice/decoding circuit 7-1 and display circuit 7-2, the video signal from the tuner circuit 2 is inputted to the slice/decoding circuit 7-1 of the $\mu$con B 7.

The picture recording control signal is fed from the microcomputer device A ($\mu$con A) 5 to the picture recording circuit 6, and the picture recording is controlled therein. The remote control signal is fed from the remote control input circuit 3 to the $\mu$con A 5, and the $\mu$con A 5 outputs the reservation display information to the display means 9 such as a display tube and LED. Further, for displaying reservation information on the screen of a television set, the reservation information outputted from the $\mu$con A 5 is converted to a video signal in the display circuit 10. For example, a character generator for displaying a display information and frame memory for displaying are provided in the display circuit 10.

The remote control input circuit 3 receives a remote control key information when the remote control key 4 is operated, demodulates modulated remote control key information, and transmits the demodulated remote control information to the $\mu$con A 5. When, for example, recording time data and recording channel data for picture recording reservation are transmitted from the remote controller 4, these data are fed to the μcon A 5 for picture recording reservation. The picture recording reservation is controlled by the μcon A 5.

Further, a picture recording is reserved by the remote controller 4, and then power supply to the picture recorder is turned off, when, the picture recorder is brought in the waiting condition, a reservation waiting information is fed from the μcon A 5 to the display means 9, the condition that the picture recorder is in waiting condition is displayed by the display tube or LED. Thereby, a user sees the display on the display means 9 and recognizes the condition that the picture recorder is in picture recording reservation.

When a picture recording is reserved by the remote controller 4, the content of picture recording reservation inputted by key operation of the remote controller 4 is displayed on the screen of the television set, it is possible to reserve a picture recording with confirming the picture displayed on the screen.

Figures 7, 8:
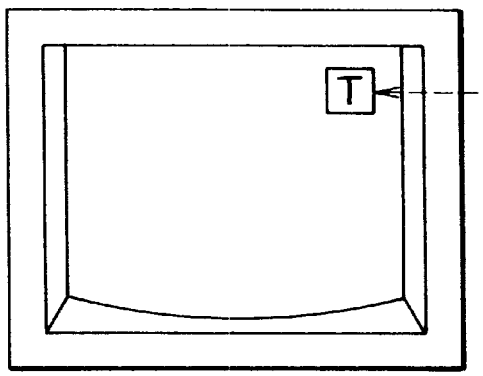
FIG. 7 is a diagram for illustrating an example in which the existence of a reservation is shown by an icon in the picture recorder of the present invention.
FIG. 8 is a diagram for illustrating a menu picture of the electronic program guide.

The change-over switch 11 is served for change-over controlling of a picture displayed on the monitor screen. For example, when a user reserves a picture recording or selects a channel using the electronic program guide, by inputting the change-over key provided on the remote controller, the change-over switch 11 is controlled so as to connect to the display circuit 7-2. In this case, a picture of program guide is displayed as shown in FIG. 8, then the user can select a desired program on the program guide picture, and can reserve a picture recording and select a channel for the program.

On the other hand, in the condition that the change-over switch 11 is connected to the display circuit 10, for example, when a user inputs a picture recording month and day, picture recording channel, and picture recording time for picture recording reservation from the remote controller or the operation means of the television set, the picture recording reservation information is displayed.

The μcon B 7 is a microcomputer for controlling the information concerning the electronic program guide inserted in the received video signal, picks up the electronic program guide data inserted in the vertical blanking interval (VBI) of the video signal of a channel selected using the tuner circuit 2, decodes it, thereafter stores it in the memory 8 (SRAM). When, the slice/decoding circuit 7-1 executes waveform shaping of the electronic program guide data, after the waveform shaping, decodes the electronic program guide data.

To display the electronic program guide decoded on the screen of the television set, the electronic program guide is converted to the video signal by the display circuit 7-2, and the video signal is inputted to the one fixed contact of the change-over switch 11. The display circuit 7-2 is provided with a character generator and frame memory for displaying.

In the condition that the change-over switch 11 is switched as shown in FIG. 1, the electronic program guide picture is displayed on the screen of the television set, by operating the remote controller 4 on the electronic program guide picture, a user can select a desired program and reserve the program for picture recording.

As described herein above, data of the electronic program guide are inserted in the vertical blanking interval (VBI) of video signal, the electronic program guide data covers, for example, programs in the period of 7 days, therefore the memory 8 has a memory capable of storing the electronic program guide data for 7 days covering about 70 channels.

The μcon A 5 and μcon B 7 are structured so as to communicate each other, a reservation information for picture recording reservation under the control by the μcon B 7 and remote control information transmitted from the remote controller 4 is transferable mutually.

Next, the picture recorder structured as described herein above is provided the first reservation means for picture recording reservation using the electronic program guide as shown in the above-mentioned FIG. 9 and the second reservation means for picture recording reservation by inputting picture recording month and day, picture recording time, and picture recording channel as shown in the above-mentioned FIG. 10 for picture recording reservation.

In the picture recorder of the present invention advantageously, a user can select as desired the priority between the picture recording reservation reserved by the first reservation means and the picture recording reservation reserved by the second reservation means.

Herein, the method for picture recording reservation using the first reservation means is described in detail herein under. The channel in which the electronic program guide data are inserted in VBI is selected by the tuner 2, and the video signal of the channel is inputted to the μcon B 7. The μcon B 7 separates and decodes the electronic program guide data from the input video signal, converts it to the video signal of the menu picture as shown in FIG. 9A, and outputs it in the display circuit 7-2. The video signal is inputted to a television set not shown in the figure through the switch 11, and the electronic program guide as shown in FIG. 9A is displayed on the screen.

The electronic program guide contains programs for all channels, therefore when the number of channels are large, one picture can not display all the programs, in that case, the picture is scrolled until a desired electronic program guide is displayed on the screen. When the program to be reserved for picture recording is displayed, cursor moving keys of the remote controller 4 are operated to move the cursor to the row of the program desired to be reserved. When, the background color or display condition of the row where the cursor is moved is changed to a special display condition such as reverse printing as shown in FIG. 9A.

In the example shown in FIG. 9A, the cursor is moved to the program row of City Slickers which will be broadcasted on the channel of SHOW from 8:00 p.m. on Sep. 7 for 2 hours, the display condition of the program row is changed. In this condition, by pushing the picture recording reservation button (Rec key) of the remote controller 4, this program is reserved for picture recording.

Then, the picture display changes to a picture display as shown in FIG. 9B for indicating the program which was reserved for picture recording, thereby the user can confirm the picture recording reservation of City Slickers which will be broadcasted on the channel of SHOW from 8:00 p.m. on Sep. 7 for 2 hours.

The picture recording can be reserved by the first reservation means as described herein above, the μcon B 7 controls the display which involves picture recording reservation.

Next, a method is described herein under referring to FIGS. 13A–13B to FIGS. 17A–17E for correcting the picture recording reservation when a program desired to be reserved by the first reservation means is overlapped with a program which was already reserved for picture recording.

Figure 13A:
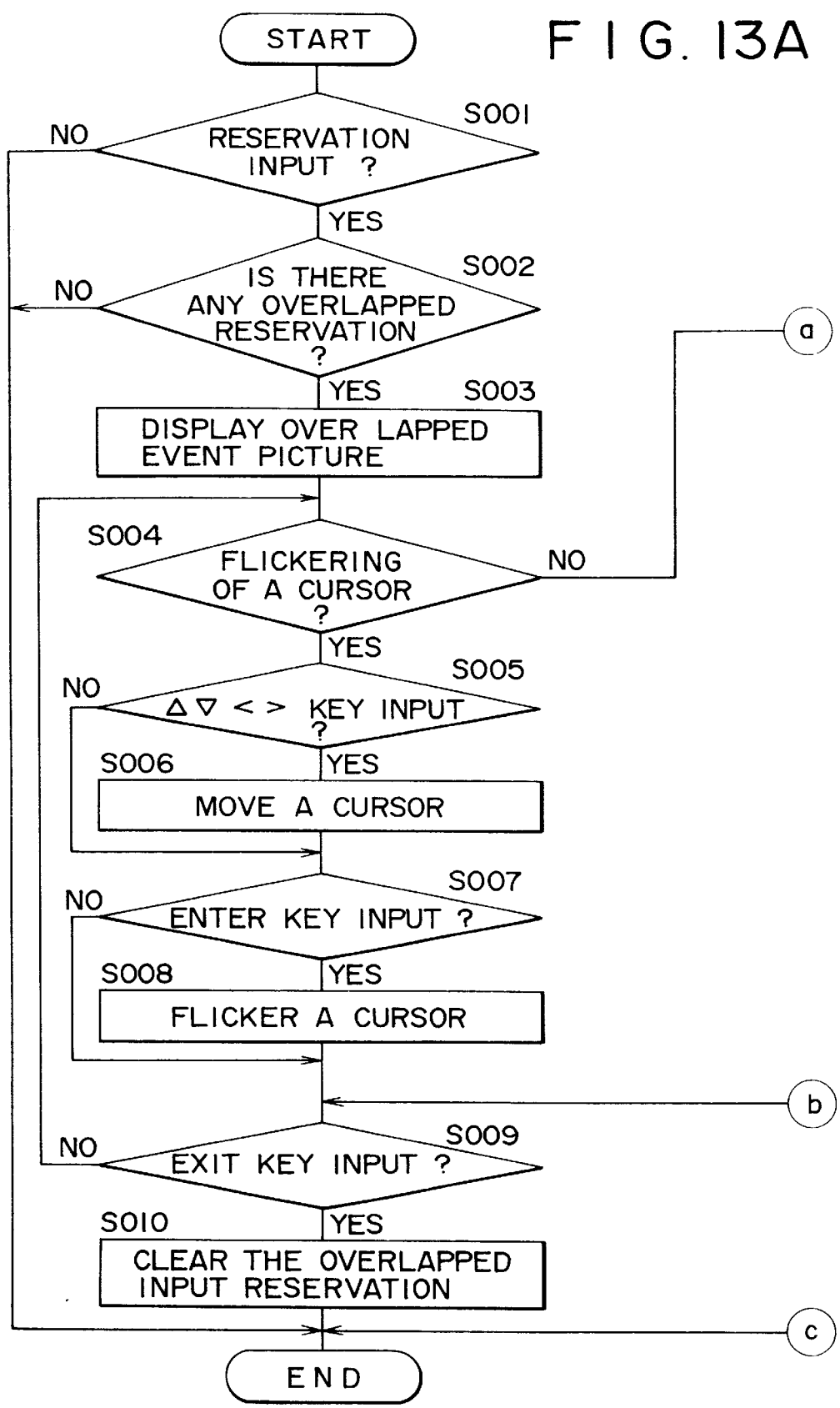
FIGS. 13A–13B is a flowchart for illustrating the processing when program reservation by the first reservation means in accordance with the embodiment of the present invention overlaps.
Figure 13B:
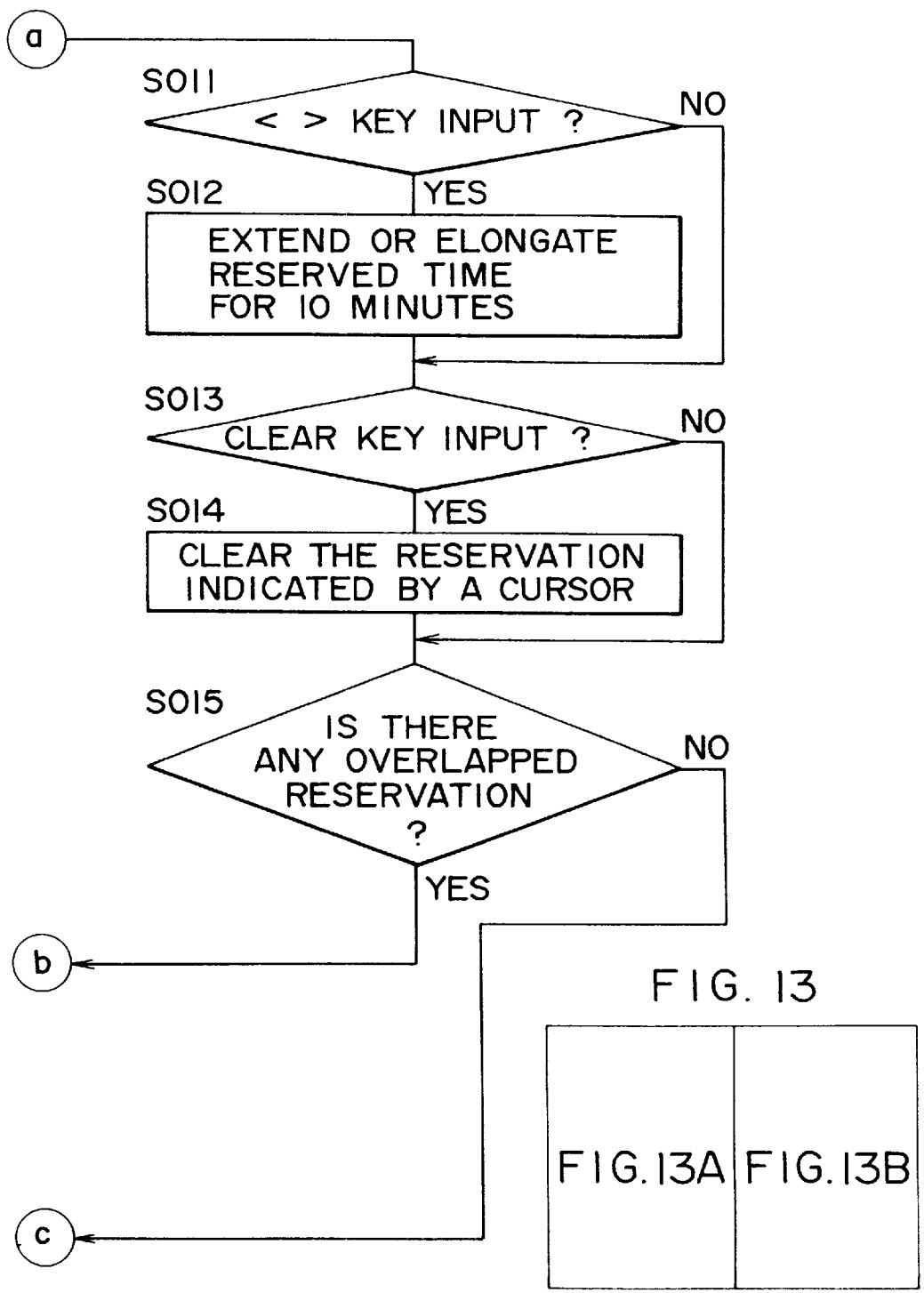

FIGS. 13A–13B is a flowchart for describing the first reservation correcting method for correcting on a program guide picture when picture recording reservations by the electronic program guide are overlapped.

First, in the case that a user reserves picture recording on a program guide picture, in the step S001, the existence of a program which was already reserved for picture recording is determined, if it is YES, in the step S002, whether the reserved time of the program which is now reserved for picture recording is overlapped with the reserved time of the program which was already reserved for picture recording is determined.

If the determination is NO, the process proceeds to the end, but if the determination is YES, the process proceeds to the step S003.

For example as shown in FIG. 14, the News which will be broadcasted on the channel A from 8:00 p.m. on Sep. 7 for 2 hours is already reserved, and when the user reserved now a picture recording of the Movie which will be broadcasted on the channel B, in the step 002, the reserved time for picture recording of the Movie program which is now reserved is determined to be overlapped with the News program which was already reserved for picture recording.

Figure 15A:
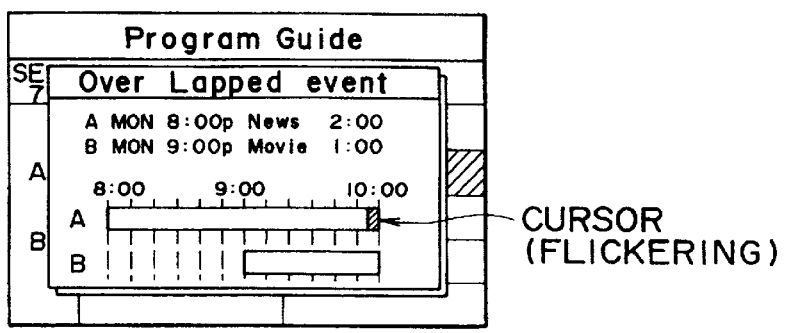
FIGS. 15A–15B is a set of diagrams for illustrating the overlap information picture displayed when a program is reserved by the electronic program guide and the position of a cursor displayed.

In the step S002, if the determination is YES, an overlap information picture (Overlapped Event) for indicating the overlapped programs in picture recording time as shown in FIG. 15A is pop-up displayed on the program guide picture (S003).

On the overlap information picture, the reservation information such as a channel, a day of the week, a starting time of picture recording, a title of program, and a picture recording time is displayed as shown in FIG. 15A on the upper portion of the picture, and the bar indication of a picture recording reservation time of the overlapped programs is displayed on the lower portion of the picture. Further, the flickering cursor is displayed at the right end of the one bar of the bar indication (S004).

Figure 15B:
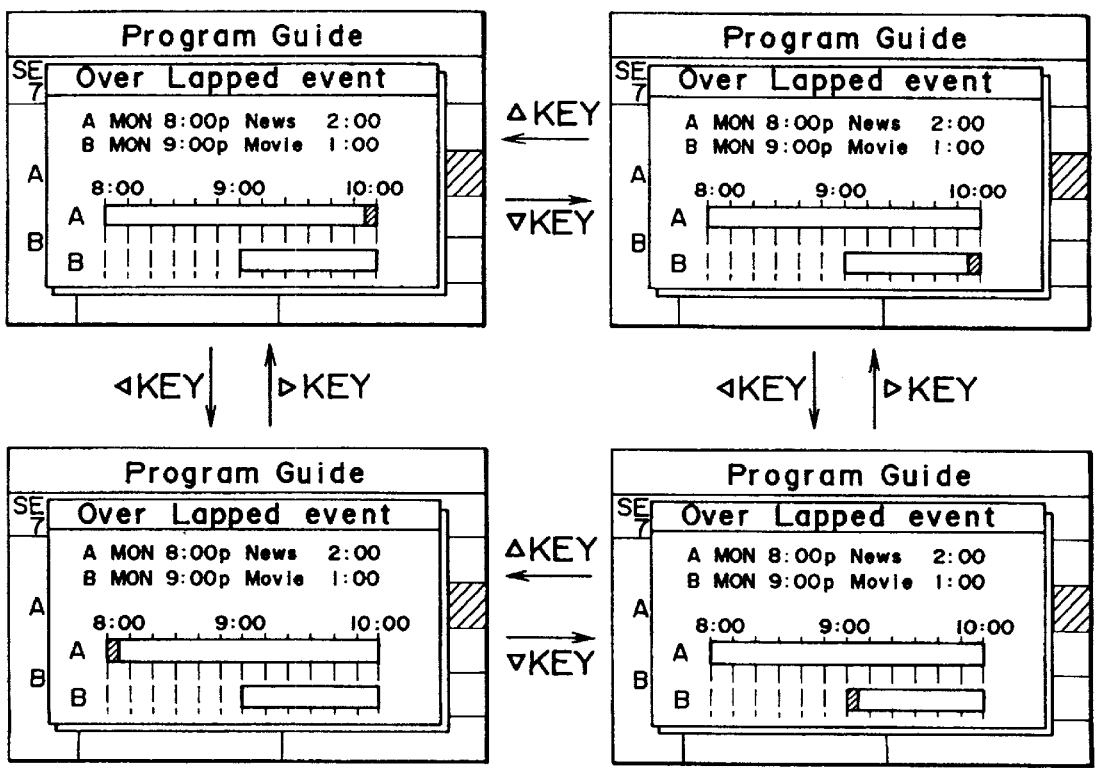

The position of the flickering cursor can be moved by operating "∧, , <, >" cursor moving keys provided on the remote controller, for example, by operating "<" cursor moving key in the condition that the flickering cursor is positioned at the right end of the bar indicator, the cursor is moved to the head of the bar indicator of the channel A as shown in FIG. 15B.

By operating "" cursor moving key, the cursor is moved to the tail of the bar indicator of the channel B.

When the user corrects a starting time of the overlapped program which is reserved for picture recording, the cursor is moved to the head of the bar indicator of the program to be corrected. When the ending time is corrected, the cursor is moved to the tail of the bar indicator of the program to be corrected (S005, S006), and "Enter Key" key is inputted, then the cursor is changed from flickering to lighting on, and the mode is changed to the correction mode of the picture recording reservation time (S007 and S008).

Next in the step S009, the existence of "Exit Key" key input is determined, when "Exit Key " key is inputted, the overlapped picture recording reservation inputted later is erased forcibly, thus the correction processing is brought to an end (S009 and S010).

On the other hand, if the determination is NO in the step S009, the process returns to the step S004 and again whether the cursor is flickering is determined. Therefore, this sequence of operations is repeated until "Enter Key" key is inputted to change the cursor to lighting on condition in the step S007 or "Exit Key" key is inputted to end the correction processing in the step S009.

In the step S004, if the condition of the cursor is determined to be not in flickering but in lighting on, the process goes to the branch step S011 to determine the existence of input of "<, >" cursor moving key. When, for example, the cursor is lighting on at the tail of bar indicator of the channel A, if "<" cursor moving key is inputted, the picture recording ending time on the channel A is shortened by, for example, 10 minute unit.

When the cursor is lighting on at the head of the bar indicator of the channel A, if ">" cursor moving key is inputted, the picture recording starting time on the channel A is delayed by, for example, 10 minute unit (S012).

When the cursor is lighting on, if "Clear Key" key is inputted, the picture recording reservation where the cursor is positioned is erased (S013 and S014).

Figure 16A:
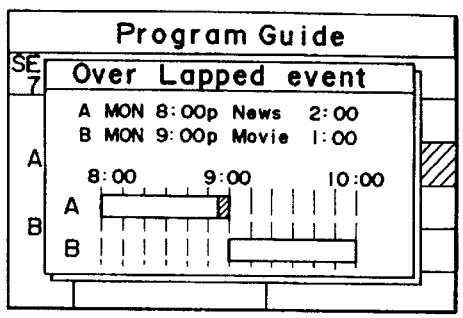
FIGS. 16A–16C is a set of diagrams for illustrating an example of picture display when the picture recording reservation is corrected on a program guide picture.
Figure 16B:
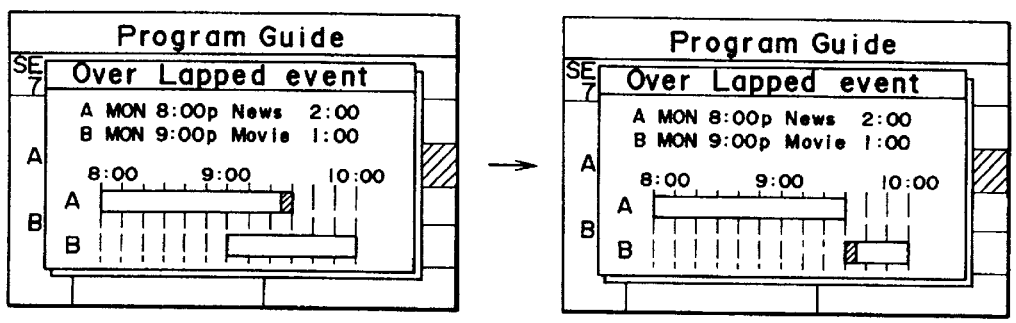
Figure 16C:
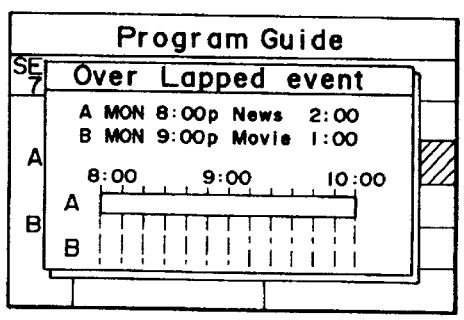

FIG. 16A shows an example that, in the overlapped information picture as shown in FIG. 15A, the ending time of the program of A channel is expedited by 1 hour to eliminate the overlapping with the program of B channel, FIG. 16B shows another example that the ending time of the channel A is expedited by 30 minutes, thereafter the cursor is moved to the channel B, the starting time of picture recording on the channel B is delayed by 30 minutes, thus the overlapping is corrected and eliminated. FIG. 16C shows yet another example that "Clear Key" key is inputted in the condition of the cursor being positioned on the bar indicator of the channel B to erase the picture recording reservation of the channel B.

Then in the step S015, whether the picture recording reservation is overlapped is determined, if the determination is NO, the correction processing goes to the end.

On the other hand, in the step S015, if the determination is YES, in the step S009, the existence of "Exit Key" key input is determined again, if the determination is NO, the process returns to the step S004 to determine the flickering of the cursor, and the correction processing of picture recording time is continued.

As described herein above in the picture recorder in accordance with the embodiment of the present invention, overlapping of the reservation time of a program reserved for picture recording using the program guide is determined, if the reservation time is overlapped, an overlapped information picture is displayed to inform a user the overlapped program reserved for picture recording. Then the starting time or ending time of reserved programs can be corrected or desired reserved program can be erased for convenience in use.

Next, the second reservation correcting method for correcting the overlapping of the picture recording reservation using the electronic program guide on the program guide picture is described referring to FIG. 17.

When the picture recording is reserved using the program guide picture, a program desired to be reserved is selected on the program guide picture and "Rec Key" key is operated, thereby the picture recording is reserved, in this case, for example, the News program on the channel A is reserved for picture recording as shown in FIG. 17A, the background color of the program row of this program is changed to red.

In the condition that a program is reserved for picture recording, for example, if a user moves the cursor to the Movie program which will be broadcasted on the channel B, then pushes the picture recording reservation button "Rec Key", the picture recording time overlaps with that of the News program of the channel A which was already reserved for picture recording, then ? mark is displayed at the head of the title of the Movie program of the channel B to be reserved now for picture recording as shown in FIG. 17B, and, for example, the background color of the overlapped programs reserved for picture recording of the channels A and B is changed from red to yellow, thus the overlapping of the program reservation is indicated to the user.

When the overlapping of recording time of the channel A and channel B is eliminated so that a user can reserve picture recording of the Movie program of the channel B, for example, by shortening the recording time of the News program of the channel A, the cursor is moved to the program row of the News program of the channel A displayed in yellow, and the picture recording reservation button "Rec Key" is pushed again. Thereby, the program row of the channel A begins flickering, and by pushing "<" key out of the right and left cursor moving keys of the remote controller in the condition of flickering, the picture recording time of the channel A is shortened (for example 10 minute unit) as shown in FIG. 17C. When the overlapping of the recording time of the program of the channel A with that of the program of the channel B is eliminated, that is, when the overlapped picture recording reservation is eliminated, the background color changes to red which indicates the normal reserved picture recording condition, thus the picture reservation is completed.

Otherwise, for example, in the condition that the program row reserved for picture recording is flickering, ">" key out of right and left cursor moving keys of the remote controller is pushed, the reservation starting time can be delayed by, for example, 10 minute unit. When the picture recording starting time or picture recording ending time is corrected wrong by moving the cursor moving keys, the picture recording reservation is returned to the initial condition by pushing "CANCEL Key" provided on the remote controller.

Such correction of the picture recording reservation time is possible not only in the condition that the picture recording reservation is overlapped with the displayed program row colored yellow but also in the condition that the picture recording reservation is normal with the displayed program row colored red.

In the example described herein above, the overlapped picture recording reservations are displayed on the same program guide picture, therefore a user can correct easily the reserved time with confirming the program row, however in the case that many channels are available and the program guide information is displayed over a plurality of pages, and the overlapped picture recording reservations are displayed on different pages, it is not easy to find out the overlapped programs.

When the program guide information of overlapped programs reserved for picture recording is displayed on a plurality of pages, for example, "List Key" of the remote controller is pushed.

Thereby, an overlapped information picture is displayed on the monitor as shown in FIG. 17 (e), the user can confirm the list of the overlapped programs. Further, the picture recorder may be structured so that the picture recording reservation is corrected on this picture display by operating the cursor moving keys to cancel the picture recording reservation, expedite the ending time of the picture recording reservation, or delay the picture recording starting time.

In the above-mentioned correction method for correcting picture recording reservation time, the picture recording ending time is shortened by 10 minute unit or the picture recording starting time is delayed by 10 minute unit by operating the cursor moving keys on the screen, otherwise, the picture recorder may be structured so that the picture recording starting time or picture recording ending time is corrected to the point sufficient for eliminating the overlap.

Though the number of days included in the electronic program guide stored in the picture recorder is restricted by the memory capacity or the quantity of transmitted data, for example, even when the program which will be broadcasted on the month and day when the electronic program guide data is not stored yet is selected, the picture recording reservation and correction of picture recording reservation are possible.

Next, a method for picture recording reservation for the second reservation means is described. In the reservation means, the display circuit 10 outputs the video signal of the picture recording reservation picture as shown in FIG. 10 by controlling the display circuit 10 using the $\mu$con A 5. The video signal is inputted to the television set through the change-over switch 11, and the picture recording picture shown in FIG. 10 is displayed on the screen.

Then, the picture recording month and day information, picture recording time information, and picture recording channel information are transmitted by operation of keys provided on the remote controller 4. The transmitted signal is received and demodulated by the remote controller input circuit 3 and the picture recording month and day information, picture recording time information, and picture recording channel information are inputted from the remote controller input circuit 3 to the $\mu$con A 5. The $\mu$con A 5 receives these information, and transmits the data for displaying to the display circuit 10, thereby the picture recording reservation picture including the picture recording reservation information is displayed as shown in FIG. 10.

On the picture display shown in FIG. 10, July 6, WED, 7:00 a.m., and 8:00 a.m. are displayed as the picture recording month and day, picture recording starting time, and picture recording ending time respectively, a user reserves a picture recording with confirming this picture display.

The $\mu$con A 5 executes the second reservation method, and when the time comes to the starting time of a picture recording reservation by the first reservation method, the $\mu$con B 7 transmits the picture recording control signal to the $\mu$con A 5, then the $\mu$con A 5 transmits the picture recording control signal to the picture recording circuit 6 to execute recording according to the first reservation method.

In the picture recorder of the present invention, an option picture is displayed as shown in FIG. 2. The option picture is displayed to select any picture recording reservation to be executed preferentially out of picture recording reservations reserved by the first reservation means and second reservation means. The TIMER row is available in the option picture shown in FIG. 2, in this row, an icon A for indicating the second reservation means and icon B for indicating the first reservation means are displayed. If the cursor is moved to the icon A, the display mode of the icon A is changed as shown in the figure, and preferential execution of the picture recording reservation by the second reservation means is set. On the contrary, if the cursor is moved to the icon B, preferential execution of the picture recording reservation by the first reservation means is set.

For example, operations of the picture recorder when the cursor is moved to the icon B to set preferential execution of picture recording reservation by the first reservation means is described referring to FIGS. 3A–3B.

FIGS. 3A–3B show the case that the first reservation means and second reservation means reserve picture recording of different programs which will be broadcasted on the same month and day and at the same time, and shows the job (JOB) executed by the $\mu$con A 5 and timing for execution of picture recording. The $\mu$con A 5 and $\mu$con B 7 execute their various jobs using 1 period of the vertical synchronizing signal (Vsync) of the video signal as a unit by time sharing.

Programs which will be broadcasted on the same day at the same time are reserved by the first reservation means and the second reservation means, therefore when the μcon A 5 refers the timer, and thereby the μcon A 5 detects that the time comes to the starting time of the reserved picture recording at the timing of the starting time shown in FIG. 3A, and the μcon B 7 detects that the time comes to the starting time of the reserved picture recording at the timing of the starting time shown in FIG. 3A.

Then, the μcon A 5 receives an indication of execution of the picture recording reservation by the first reservation means from the μcon B 7 through communication with the μcon B 7 in the job (1) shown in the row of JOB, and the μcon A 5 transmits a picture recording control signal to the picture recording circuit 6 to execute recording of the picture recording reservation by the first reservation means. Thereby, the picture recording reservation by the first reservation means is executed (B) as shown in the figure.

Then, the picture recording reservation by the second reservation means is executed (A) in the job (2) shown in the row of JOB, when, because the picture recording reservation reserved by the first reservation means had set to be executed preferentially, the execution of the picture recording reservation reserved by the second reservation means is canceled. Therefore, as shown in the figure, the picture recording circuit 6 records the program reserved for picture recording by the first reservation means.

Operations of the picture recorder when the μcon A 5 refers the timer and detects that the time comes to the starting time of the picture recording reserved at the timing of the starting time as shown in FIG. 3B is described herein under. In this case, also the μcon B 7 detects that the time comes to the starting time of the picture recording reserved at the timing of the starting time shown in FIG. 3B.

Then, the picture recording reservation by the second reservation means is executed (A) in the job (2) shown in the row of JOB. In detail, the μcon A 5 outputs a picture control signal to the picture recording circuit 6, and the picture recording circuit 6 starts to record the program reserved for picture recording by the second reservation means.

Then, the time comes to the next period of Vsync, the μcon A 5 receives the indication for execution (B) of the picture recording reservation by the first reservation means through communication with the μcon B 7 shown by the job (1) in the row of JOB, and the μcon A 5 transmits the picture recording control signal to the picture recording circuit 6 to execute recording of the picture recording reservation by the first reservation means. Thereby, the picture recording reservation by the first reservation means is executed (B) instead of the execution (A) of the picture recording reservation by the second reservation means as shown in the figure.

As described herein above, regardless of the arrival of a starting time, finally the picture recording circuit 6 records the program reserved for picture recording by the first reservation means, thus the confusion in execution of picture recording reservation is prevented.

Figure 4:
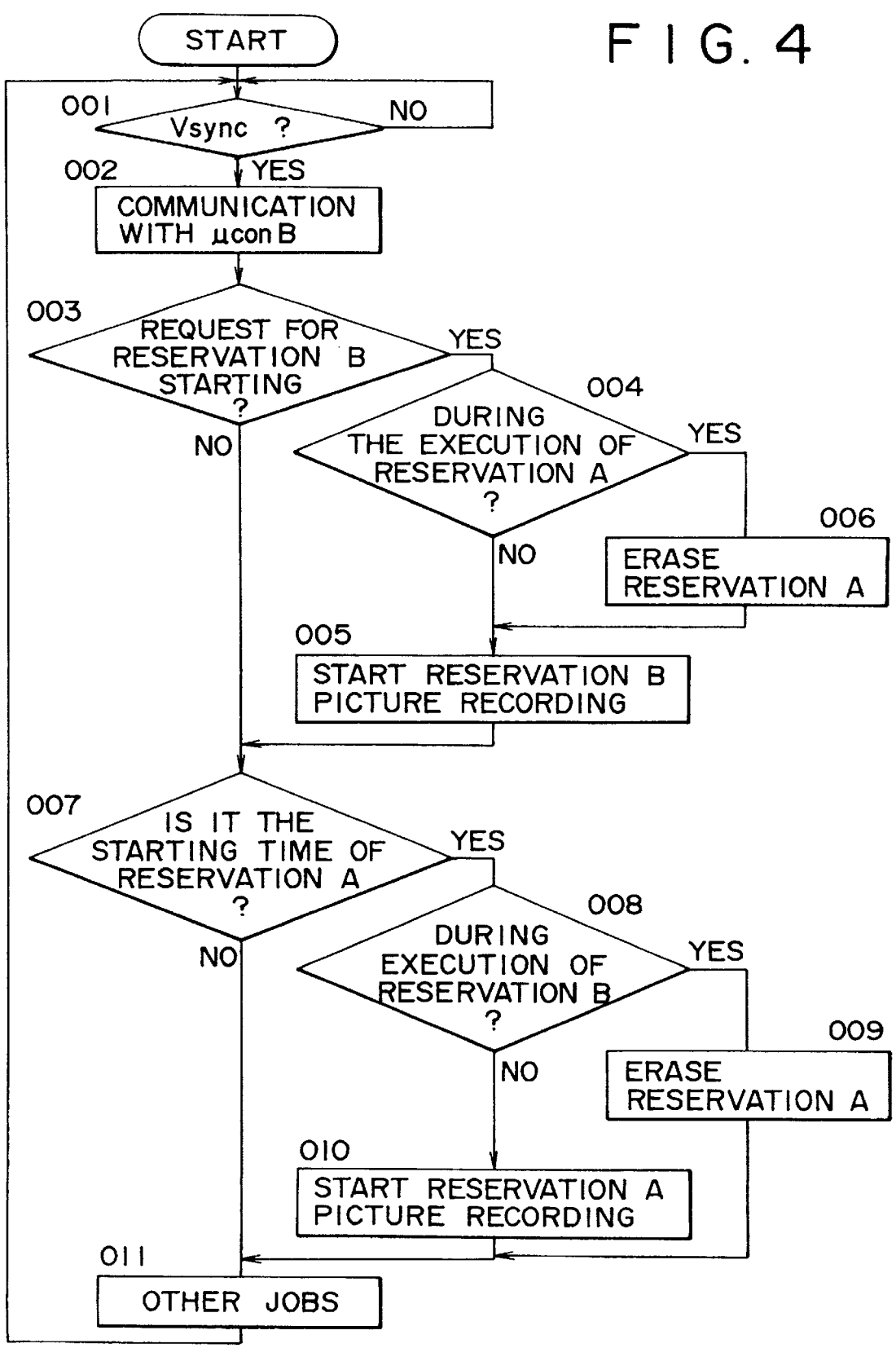
FIG. 4 is a flowchart for describing reservation execution control routine of $\mu$con A when the execution of reservation B is preferential in the picture recorder of the present invention.

A flowchart of reservation execution control routine executed by the μcon A 5 is shown in FIG. 4 for the above-mentioned case.

Upon starting of this routine, whether Vsync arrived is determined in the step 001, the step 001 is operated repeatedly until Vsync arrives. When Vsync arrives, the Vsync is determined to be YES in the step 001, then the μcon A 5 communicates with the μcon B in the step 002. Whether the communication content includes the starting request for a picture recording reservation (reservation B) by the first reservation means is determined in the step 003, if the starting request is not included and therefore the determination is NO, the process proceeds to the step 007, and whether the time comes to the starting time of the picture recording reservation (reservation A) by the second reservation means is determined. If the time of the timer built in the internal of the μcon A 5 passes the starting time of the picture recording reservation, the determination is YES.

If the time does not pass the starting time and therefore the determination is NO, other jobs (JOB) are operated in the step 011 and the process returns to the step 001. In the other jobs, the detection processing of operated keys out of the keys provided on the picture recorder and the reception processing of signals transmitted from the remote controller 4 are operated.

If the starting request is included in the communication content and therefore the determination is YES in the step 003, the process branches to the step 004, and whether the reservation A is under operation is determined. When, if the reservation A is not under operation as shown in FIG. 3A, the determination is NO, then picture recording of the reservation B is started in the step 005.

If the reservation A is under operation as shown in FIG. 3B in the step 004, the process branches to the step 006 and the reservation A is erased, then the process proceeds to the step 005 and picture recording of the reservation B is started.

If the arrival of the starting time of the reservation A is detected, the determination is YES, then the process branches to the step 008, then whether the reservation B is under operation is determined. When, if the reservation B is under operation as shown in FIG. 3A, the determination is YES, the process branches to the step 009 and the reservation A is erased, then the process proceeds to the step 011.

If the reservation B is not under operation as shown in FIG. 3B in the step 008, the determination is NO, and picture recording of the reservation A is started in the step 010.

The reservation execution control routine executed by the μcon A 5 is operated always by repeating a process from the step 001 to step 011 with circulation as described herein above.

In some systems, a receiving contract is required for using the electronic program guide. In detail, in the case of such systems, a user can not reserve picture recording by the first reservation means using the electronic program guide without a receiving contract, the picture recording reservation by the first reservation means is acceptable only after completion of the receiving contract. The picture recording reservation by the second reservation means is acceptable without contract.

It is considered that the reservation means are switched automatically depending on whether the receiving contract is completed.

Figure 5:
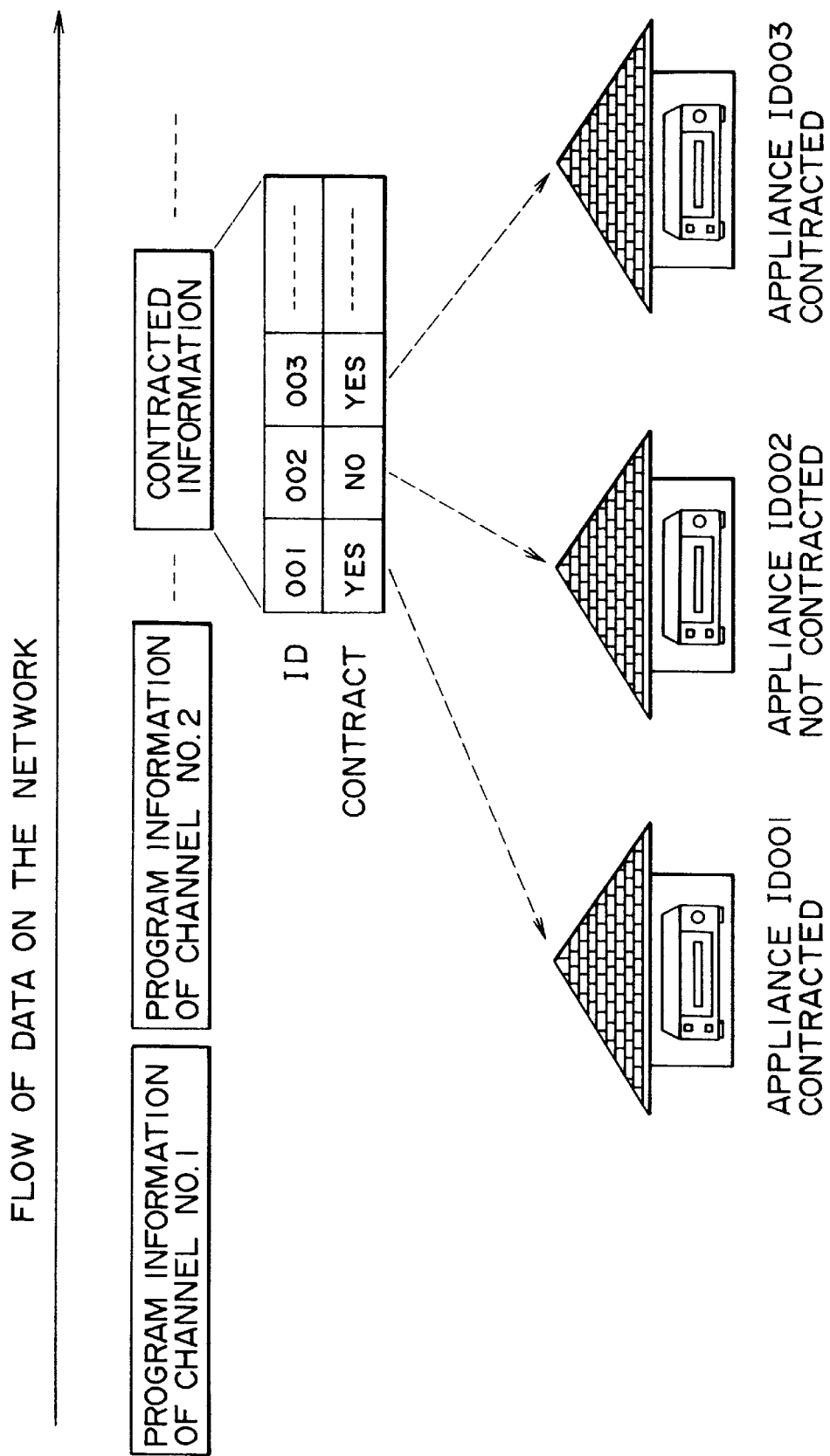
FIG. 5 is a diagram for illustrating the transmission of contracted information through a network.

FIG. 5 is a diagram for illustrating a picture recorder for automatic switching, on the network, data of channel 1 program information, channel 2 program information, . . . , contract information, . . . are available. Each home takes up data on the network to view programs of desired channels. In the example in the figure, the home having the appliance ID001 has completed the receiving contract of the electronic program guide, the home having the appliance ID002 has not completed the receiving contract of the electronic program guide, and the home having the appliance ID003 has completed the receiving contract of the electronic program guide.

The ID information of an appliance and contract information including identification of "with contract" or "without contract" are transmitted always in the contract information block on the network, the appliances ID001 to ID003 take up the contract information, and determines whether the contract information in ID column of this appliance is "with contract", and switches automatically the reservation means depending on the determined result.

Figure 6:
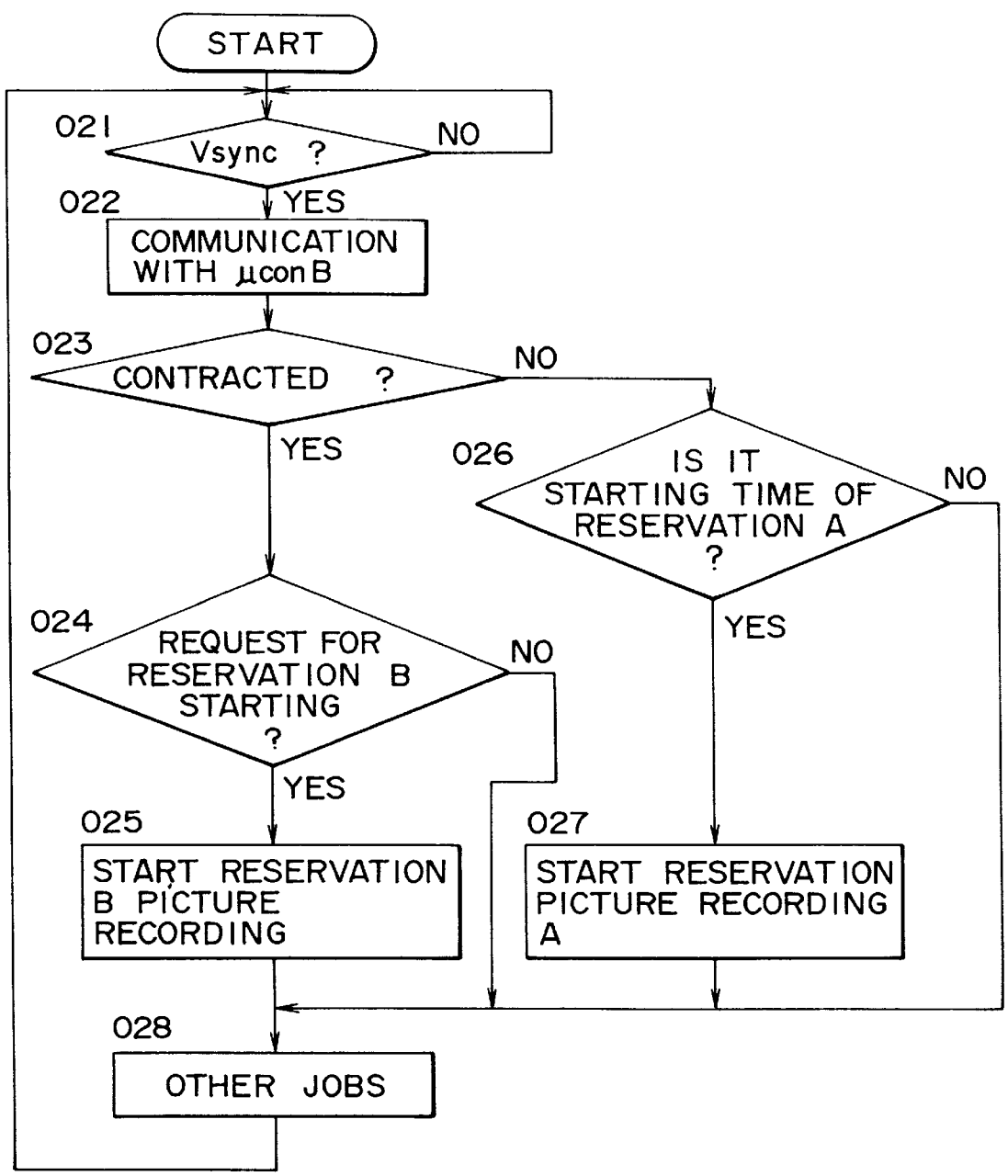
FIG. 6 is a flowchart for describing reservation execution control routine of $\mu$con A for switching the reservation means depending on before or after contract in the picture recorder of the present invention.

A flowchart of the reservation execution control routine for switching automatically the reservation means depending on the determination of "with contract" or "without contract" is shown in FIG. 6. This flow sheet is an example in which the μcon A shown in FIG. 1 operates this reservation execution control and the reservation means is switched only to the first reservation means after completion of the receiving contract.

Upon starting of the reservation execution control, whether Vsync arrived is determined in the step 021, the step 021 is repeated with circulation until Vsync arrives. When Vsync arrives, the determination is YES in the step 021, the μcon A communicates with the μcon B in the step 022. By this communication, whether this picture recorder is "with contract" or "without contract" is determined in the step 023.

If the picture recorder is determined to be "with contract" referring to the contract information of ID column of this picture recorder, the determination is YES, the process proceeds to the step 024, then whether the starting request for the picture recording reservation (reservation B) by the first reservation means is included in the communication content is determined in the step 024. If the starting request is not contained therefore the determination is NO, other jobs (JOB) is operated in the step 028, and the process returns to the step 021. In the other jobs, the detection processing of operated keys out of keys provided on the picture recorder and the reception processing of signals transmitted from the remote controller 4 are operated.

If the starting request is included in the communication content in the step 024, the picture recording of the reservation B is started in the step 025, and the process proceeds to the step 028.

If the contract information of ID column of this picture recorder is determined to be "without contract" therefore the determination is NO in the step 023, the process branches to the step 026, then whether the time comes to the starting time of the picture recording reservation (reservation A) by the second reservation means is determined. If the condition that the time comes to the starting time of the reservation A is detected, the determination is YES, the process branches to the step 027, then the picture recording of the reservation A is started. If the time does not come to the reserved starting time therefore the determination is NO in the step 026, the process proceeds to the step 028.

The reservation execution control routine from the step 021 to the step 028 executed by the μcon A 5 described herein above is operated repeatedly always.

As described herein above, the reservation execution control routine executed by the μcon A 5 includes two types as shown in FIG. 4 and FIG. 6, the type may be selected depending on the embodiment. Otherwise, the routine shown in FIG. 4 and the routine shown in FIG. 6 is integrated to form an integrated reservation execution control routine, and this routine may always be operated.

In the reservation execution reserved for picture recording by the first reservation means using the electronic program guide, the picture recording starts when the time comes to the starting time of the picture recording inevitably regardless that the picture recorder is powered on or off. On the other hand, in the case of conventional picture recorders, only when the picture recorder is in a powered off under the condition that a picture recording is reserved, the picture recorder is waiting state and displays the condition that a picture recording is reserved, however when the picture recorder is powered on under the condition that a picture recording is reserved, the picture recorder does not display the condition that a picture recording is reserved.

Therefore, when a conventional picture recorder is powered on, the user can not recognize whether a picture recording is reserved, and when the time comes to the starting time of the picture recording while power is on, it can happen to record on a recording tape prepared unintentionally, and the normal picture recording is impossible.

To solve the problem, in the picture recorder of the present invention, the picture recording reservation is displayed as long as the picture recording is reserved even under the condition that the picture recorder is powered on. The picture recording reservation is displayed by lighting on a display means 9 such as LED provided on the picture recorder. When the reservation is impossible because a recording tape is not set or a recording tape which is protected from recording is set, the display means 9 such as LED is structured to flicker.

A display tube may be used as the display means 9, and a pattern for indicating the picture recording reservation is displayed when a picture recording is reserved, and a pattern for indication that the execution of reservation is impossible is displayed when the execution of reservation is impossible.

Further, the picture recorder may be structured so that an icon for indicating the picture recording reservation is displayed on the television set as shown in FIG. 7 when the picture recording is reserved, and the icon is flicked when the execution of reservation is impossible.

As described herein above, the existence of picture recording reservation and execution possible condition are always displayed, failure of picture recording due to incorrect reservation is prevented and the picture recording is executed consistently.

In the picture recorder shown in FIG. 1, the signal transmitted through the space is received on the antenna 1, however the signal transmitted through the CATV may be inputted to the tuner circuit 2.

In the picture recorder of the present invention, the picture recording is reserved by the first reservation means and the second reservation means independently as described hereinbefore, however it may be also possible that the picture recording is reserved by the first reservation means, thereafter the picture recording is reserved by the second reservation means, when the picture recording is reserved by the second reservation means, the information of picture recording which was already reserved is displayed previously on the picture recording reservation picture. In this case, when the picture recording is reserved by the second reservation means and thereafter the picture recording is reserved by the first reservation means, the program information of picture recording which was already reserved is displayed previously on the electronic program guide.

Thereby, the overlapped reservation on the same day and at the same time by the first reservation means and second reservation means is prevented mostly. The mutual transfer of reservation information is operated by the communication between the μcon A 5 and μcon B 7.

In the embodiments of the present invention, cases that the present invention is applied to the picture recorder provided with the electronic program guide is described, the present invention is not limited to the cases, the present invention is applied to any electronic appliance as long as the appliance is provided with the electronic program guide.

As described herein above, in the electronic appliance of the present invention, when picture recording reservations reserved using the electronic program guide are overlapped, overlapped programs reserved for picture recording are displayed, thereby the overlapped programs reserved for picture recording are recognized easily.

The picture recording starting time or picture recording ending time is corrected or erased on the program guide, thereby, when reserved programs are overlapped, only a portion of the program is reserved for picture recording, or the picture recording reservation already reserved is cancelled easily, thus the convenience in picture recording reservation using the electronic program guide is improved.

Because the present invention is structured as described herein above, the decision whether the reservation by the first reservation means is operated or the reservation by the second reservation means is operated when the time comes to the picture recording reservation starting time is executed according to the priority which was prescribed previously, the confusion in the reservation execution is prevented.

Further, the condition of picture recording reservation is displayed when picture recording is reserved, a recording tape which is surely available for execution of the reservation is set on the picture recorder.

What is claimed is:

1. An electronic appliance displaying electronic program guide information superposed on a television signal, comprising reservation means for reservation of picture recording of a desired program based on said electronic program guide information, and display means for displaying an icon on a television screen in connection with the television screen, exclusive of a recording menu, when a picture recording is reserved by said reservation means.

2. The electronic appliance of claim 1, wherein said display means displays an altered form of the icon on the television screen when execution of recording the reserved program is impossible due to a specific condition of a recording medium for recording the program.

3. A method comprising:
displaying electronic program guide information superposed on a television signal;
reserving a picture recording of a desired program based on said electronic program guide information; and
continuously displaying an icon on a television screen in connection with the television signal, exclusive of a recording menu, when a picture recording menu, when a picture recording is reserved in said reserving step.

4. The method of claim 3, further comprising displaying an altered form of the icon on the television screen when execution of recording the reserved program is impossible due to a specific condition of a recording medium for recording the program.

5. The electronic appliance of claim 1, wherein said display means displays an altered form of the icon on the television screen when execution of recording is impossible because a recording medium is not set.

6. The electronic appliance of claim 1, wherein said display means displays an altered form of the icon on the television screen when execution of recording is impossible because a recording medium is protected from recording.

7. The method of claim 3, further comprising displaying an altered form of the icon on the television screen when execution of recording the reserved program is impossible because a recording medium is not set.

8. The method of claim 3, further comprising displaying an altered form of the icon on the television screen when execution of recording the reserved program is impossible because a recording medium is protected from recording.

9. Apparatus for use with a television that displays electronic program guide information superposed on a television signal, said apparatus comprising:
reservation means for reserving picture recording of a desired program to be recorded, based on said electronic program guide information; and
display means for displaying an icon on a television screen of said television, in connection with the television signal;
said display means continuously displaying the icon on the television screen, exclusive of a recording menu, when a picture recording is reserved by said reservation means, with said icon being displayed as long as the picture recording is reserved.

10. Apparatus of claim 9, wherein said display means displays an altered form of the icon on the television screen when execution of recording is impossible due to a specific condition of a recording medium for recording the program.

11. Apparatus of claim 9, wherein said display means displays an altered form of the icon on the television screen when execution of recording is impossible because a recording medium is not set.

12. Apparatus of claim 9, wherein said display means displays an altered form of the icon on the television screen when execution of recording is impossible because a recording medium is protected from recording.

13. A method comprising:
displaying electronic program guide information superposed on a television signal;
reserving a picture recording of a desired program based on said electronic program guide information; and
continuously displaying an icon on a television screen in connection with the television signal, exclusive of a recording menu, when a picture recording is reserved in said reserving step;
wherein said icon is displayed as long as the picture recording is reserved.

14. The method of claim 13, further comprising displaying an altered form of the icon on the television screen when execution of recording the reserved program is impossible due to a specific condition of a recording medium for recording the program.

15. The method of claim 13, further comprising displaying an altered form of the icon on the television screen when execution of recording the reserved program is impossible because a recording medium is not set.

16. The method of claim 3, further comprising displaying an altered form of the icon on the television screen when execution of recording the reserved program is impossible because a recording medium is protected form recording.

* * * * *